United States Patent
Graves et al.

(10) Patent No.: US 10,064,388 B2
(45) Date of Patent: Sep. 4, 2018

(54) CONTAINER ASSEMBLY FOR YOUR PET

(71) Applicant: MARTHA DOG COMPANY LLC

(72) Inventors: Michael Edward Graves, Princeton, NJ (US); Jessica Lee Hurwit, Cheshire, CT (US); Matthew Schmitt, Skillman, NJ (US); Yuka Midorikawa Haelters, Langhorne, PA (US); Donald Samuel Strum, Princeton, NJ (US); Stephanie Casner, Irvine, CA (US)

(73) Assignee: MARTHA DOG COMPANY LLC, Irvine, CA (US)

( * ) Notice: Subject to any disclaimer, the term of this patent is extended or adjusted under 35 U.S.C. 154(b) by 775 days.

(21) Appl. No.: 14/568,763

(22) Filed: Dec. 12, 2014

(65) Prior Publication Data

US 2016/0165840 A1    Jun. 16, 2016

(51) Int. Cl.
  *A01K 29/00* (2006.01)
  *A01K 7/00* (2006.01)
  *A01K 5/01* (2006.01)

(52) U.S. Cl.
  CPC ............ *A01K 7/005* (2013.01); *A01K 5/0114* (2013.01); *A01K 29/00* (2013.01)

(58) Field of Classification Search
  CPC ....... A01K 29/00; A01K 7/005; A01K 5/0114
  USPC ....................... 119/61.56; 220/23.91; 215/10
  See application file for complete search history.

(56) References Cited

U.S. PATENT DOCUMENTS

| | | | | | |
|---|---|---|---|---|---|
| 4,984,723 | A | * | 1/1991 | Hsu | A45F 3/04 215/10 |
| 6,079,361 | A | * | 6/2000 | Bowell | A01K 7/02 119/52.1 |
| 6,405,675 | B1 | * | 6/2002 | Mills | A01K 7/00 119/51.5 |
| 6,945,416 | B2 | * | 9/2005 | Manno | B65D 59/04 206/217 |

OTHER PUBLICATIONS www.h2o4k9.com, "The Stainless Steel Water Bottle for Dogs", Sep. 1, 2014, 2 pages.
www.amazon.com, "Gulpy Water Dispensers", Sep. 1, 2014, 4 pages.
www.troffpouch.com, "Troff Hydration Pouch", Sep. 1, 2014, 2 pages.
www.amazon.com, "Collapsible Bowl", Sep. 1, 2014, 4 pages.
www.muttropolis.com, "Travel Dog Bowl", Sep. 1, 2014, 3 pages.

* cited by examiner

*Primary Examiner* — King M Chu
(74) *Attorney, Agent, or Firm* — Marshall, Gerstein & Borun LLP

(57) ABSTRACT

A container assembly for carrying a consumable material which includes a container with a sidewall and a bottom connected together. The sidewall defines an opening and at least one of, one of a bead and a recess. A receptacle member configured to receive a portion of the container wherein the receptacle member includes a sidewall and a bottom connected together. The sidewall of the receptacle member defines at least one of, the other of the one of the bead and the recess and defines a depth of the receptacle member such that with a portion of the container positioned within the receptacle member and releasably secured together, the bottom of the container and the bottom of the receptacle member are spaced apart and at least a portion of the (Continued)

sidewall of the receptacle member is positioned spaced apart from the sidewall of the container.

20 Claims, 6 Drawing Sheets

CONTAINER ASSEMBLY FOR YOUR PET

FIELD OF INVENTION

The present invention generally relates to a container for holding consumable material and a receptacle for receiving the consumable material from the container and, more particularly, to a container and receptacle for providing consumable material to a pet.

BACKGROUND

Keeping your pet, such as your dog, properly hydrated or fed while you and your pet are away from the convenience of your home is often inconvenient and problematic. Owners and their pets now travel together away from home to more destinations than ever before with the continuing growth in acceptance of your pet at more destinations. For example, such pet friendly destinations include a wide range of public locations such as coffee shops, outdoor dining restaurants, beaches, hiking trails, parks, shopping malls, sports fields and more. The destination list of acceptance for pets keeps growing wherein canines are also now welcomed in many hotels, universities and workplaces. As a result, your pet, which has the need for clean and safe water much like its owner, is now more often found displaced from the convenient access to their water bowl at home. Moreover, similar inconveniences apply to also feeding your pet.

With your pet being located away from home, pet owners take a risk that their pet will get sick drinking from various water sources. Your pet is at times left to drinking water from sources such as outdoor standing puddles or ponds that are not clean or biologically healthy, in that, they may carry undesirable bacteria and/or parasites. This can also occur from use of personal bowls that are not regularly cleaned. Some public locations such as shopping areas may provide community bowls of water for your pet, however this is a source where pets can transmit parasites and harmful bacteria to one another. In the attempt to avoid these less clean alternatives for your pet, owners will attempt to hydrate their pet in possibly a more healthy fashion by, for example, providing their pet with water from a traditional human water bottle or possibly diverting water from a public drinking fountain. Both of these methods are awkward and messy for both the owner and the pet. In particular, these attempted methods, often have your pet drinking from an unnatural position, one which does not have the pet standing and using its tongue to lap the water from a receptacle or bowl.

Attempts have been made to hydrate pets away from home, however, these attempts still introduce some form of inconvenience for the owner or unnatural presentation of the water for the pet to consume the fluid. For example, pouches for holding and carrying the water for your pet are used wherein the water contents are squirted from the pouch toward the pet for them to drink. This is often messy and an unnatural way for the pet to consume a fluid.

Bottles have been provided with an elongated trough positioned to be held over the cap of the bottle. The bottle holds the water from which the contents can fill the trough once the trough has been removed from being positioned over the cap. The trough is then held by the owner from which the pet consumes the fluid. This is inconvenient for the owner. Moreover, the owner repositions the trough over the cap with saliva residue from the pet positioned in the trough after the drinking process has been completed. This permits saliva to come into contact with the cap or spout area. The saliva will migrate onto the cap and spout area making it an unpleasant experience for the owner in grasping the saliva when resealing and reopening the bottle. Additionally, bacteria positioned onto the cap, by way of the cap coming into contact with the hand of the owner, is transmitted to the trough with the trough positioned over the cap. With reusing this packaging item for the pet, this product provides an unpleasant experience for the owner and presents a sanitary cross contamination problem to the pet.

Similarly, other bottles with troughs hinged to the bottle have been made where the trough could be rested on the ground with the bottle extending upwardly. The contents of the bottle can flow into the trough. This configuration can make it easy for either the dog or the owner to topple the bottle and spill the contents of the bottle and/or trough. Moreover, with this design, the trough is positioned to engage the side of the bottle when not in use. The trough again will carry saliva of the pet that has drank from the trough and with the trough re-engaged to the side of the bottle this saliva will be deposited on the side of the bottle. This will result in an unpleasant experience for the owner grasping the bottle with the saliva now adhering to the side of the bottle. Also, the trough will come into contact with bacteria deposited on the side of the bottle which originated from the hand of the owner that has gripped the bottle. This bacteria will be transmitted to the pet on the next serving of the pet with use of the trough. These packaging devices similarly provide an unpleasant experience for the owner and present a sanitary cross contamination problem for the pet.

Stand-alone bowls have been configured so that the bowl conveniently fits, for example, into a cup holder in a car; collapsible bowls have been used such that it can be conveniently carried in a flattened condition by the owner; and even traditional bowls have been inconveniently carried by a caring owner. However, the water, in all of these instances, must still be sought out by the owner to fill these bowls. Additionally, these items, which are typically reused, must be washed regularly to prevent the transmission of unwanted bacteria or parasites to your pet. Additionally, those containers that would conveniently fit in a cup holder in an auto, unnecessarily place any nearby electronic equipment (mobile phones, power cables, GPS equipment, etc.) in danger of being unnecessarily doused with water.

The inconveniences for providing hydrating fluid material to your pet, also applies to feeding your pet away from the conveniences of home. Pet food material is not often readily available at the destination to which you and your pet have arrived. It is not convenient to carry portions of food material for feeding your pet and separately carry a bowl from which the pet can naturally stand in front of and eat. Attempts to feed your pet with the assemblies mentioned above for providing hydrating fluid material would have similar short comings should they be used for providing food material to your pet. The pet owner is often relegated to improvising a meal for their pet which may not be as nutritious or as healthy, particularly, should your pet have a need for a special food.

Thus, there is a need for a convenient packaging in which healthy hydrating fluid or food can be carried by the owner and from which a compact convenient drinking or eating receptacle can also be provided, such that, the pet can be in a natural position to consume the healthy fluid and/or food materials without messy results for the owner and/or pet. The use of the packaging needs to make it a pleasant experience for the owner and a sanitary one for the pet in inhibiting cross contamination from the cap or spout area of the container.

SUMMARY

An object of the present invention is to provide a container assembly for carrying a consumable material. The assembly includes a container comprising a sidewall and a bottom connected to the sidewall wherein the sidewall defines an opening and at least one of, one of a bead and a recess. The assembly also includes a receptacle member configured to receive a portion of the container including the bottom of the container. The receptacle member includes a sidewall and a bottom connected to the sidewall wherein the sidewall of the receptacle member defines at least one of, the other of the one of the bead and the recess and wherein the sidewall of the receptacle member defines a depth of the receptacle member such that with the portion of the container positioned within the receptacle member and the at least one of, the one of the bead and the recess of the sidewall of the container secured to the at least one of, the other of the one of the bead and the recess of the sidewall of the receptacle member, the bottom of the container and the bottom of the receptacle member are spaced apart and at least a portion of the sidewall of the receptacle member is positioned spaced apart from the sidewall of the container.

Another object of this invention is to provide a method for assembling a container assembly for carrying a consumable material. The method includes the step of providing a container which includes a sidewall and a bottom connected to the sidewall wherein the sidewall defines an opening and at least one of, one of a bead and a recess. The method also includes the step of engaging a receptacle member configured to receive a portion of the container including the bottom of the container, wherein the receptacle member includes a sidewall and a bottom connected to the sidewall, wherein the sidewall of the receptacle member defines at least one of, the other of the one of the bead and the recess and wherein the sidewall of the receptacle member defines a depth of the receptacle member such that with the portion of the container positioned within the receptacle member and the at least one of, the one of the bead and the recess of the sidewall of the container is secured to the at least one of, the other of the one of the bead and the recess of the sidewall of the container member, the bottom of the container and the bottom of the receptacle member are spaced apart and at least a portion of the sidewall of the receptacle member is positioned spaced apart from the sidewall of the container.

Another object of the present invention includes a method for using a container assembly for carrying a consumable material. This method includes the step of disengaging a receptacle member releasably secured to a container wherein the receptacle member receives a portion of the container including a bottom of the container. The container includes a sidewall, wherein the sidewall defines an opening and at least one of, one of a bead and a recess, wherein the receptacle member comprises a sidewall and a bottom connected to the sidewall, wherein the sidewall of the receptacle member defines at least one of, the other of the one of the bead and the recess, and wherein the sidewall of the receptacle member defines a depth of the receptacle member such that with the bottom of the container positioned within the receptacle member and the at least one of, the one of the bead and the recess defined by the sidewall of the container secured to the at least one of, the other of the one of the bead and the recess of the sidewall of the receptacle member, the bottom of the container and the bottom of the receptacle member are spaced apart and at least a portion of the sidewall of the receptacle member is positioned spaced apart from the sidewall of the container. The method also includes the step of dispensing consumable material from the opening of the container into the receptacle member.

DETAILED DESCRIPTION

Figure 1:
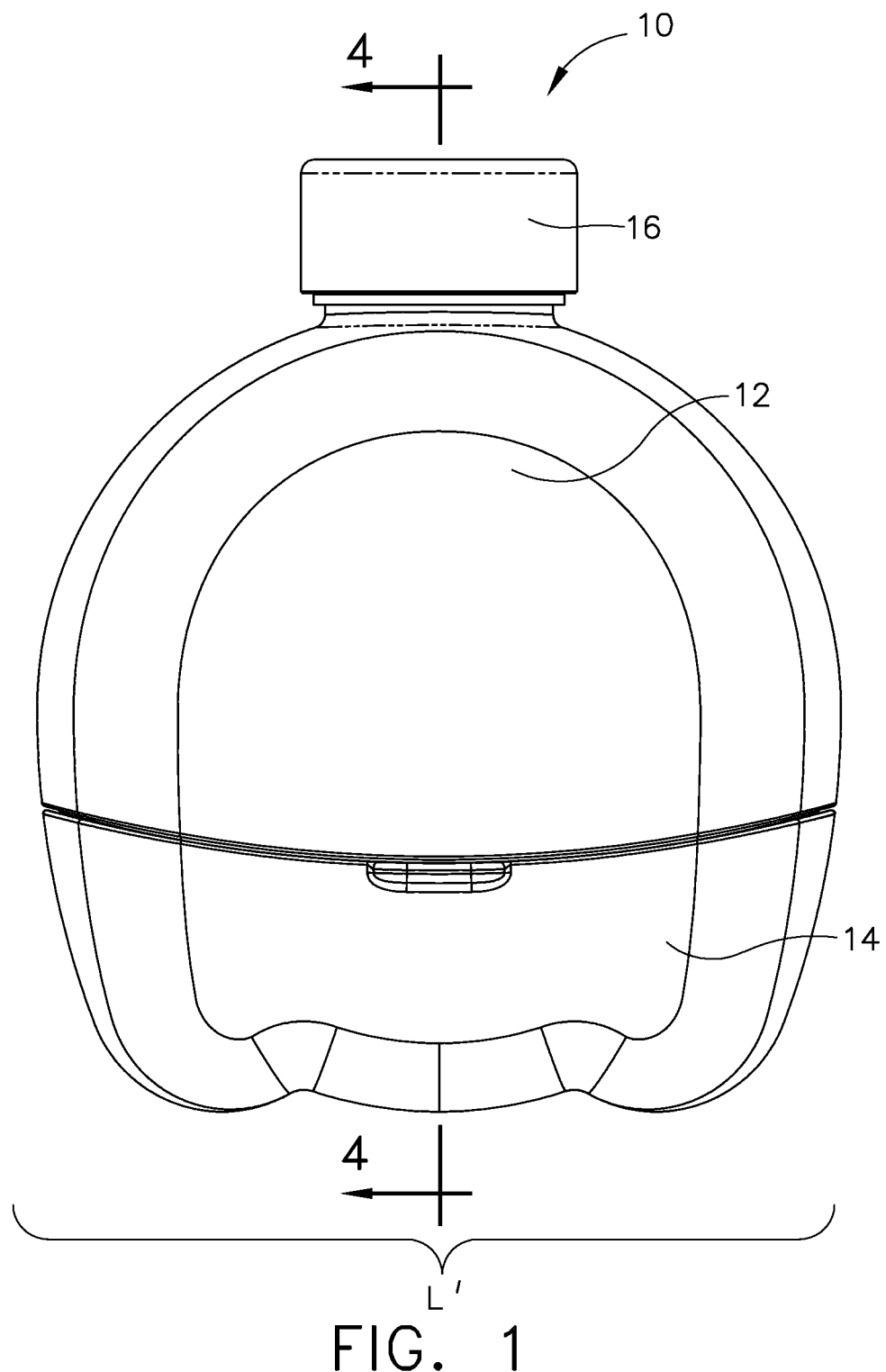
FIG. 1 is a front elevation view of an embodiment of the container assembly of the present invention fully assembled.

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways apparent to those skilled in the art which are within the scope of the present invention. Also, it is understood that the phraseology and terminology used herein is for the purpose of description and should not be regarded as limiting.

Figure 2:
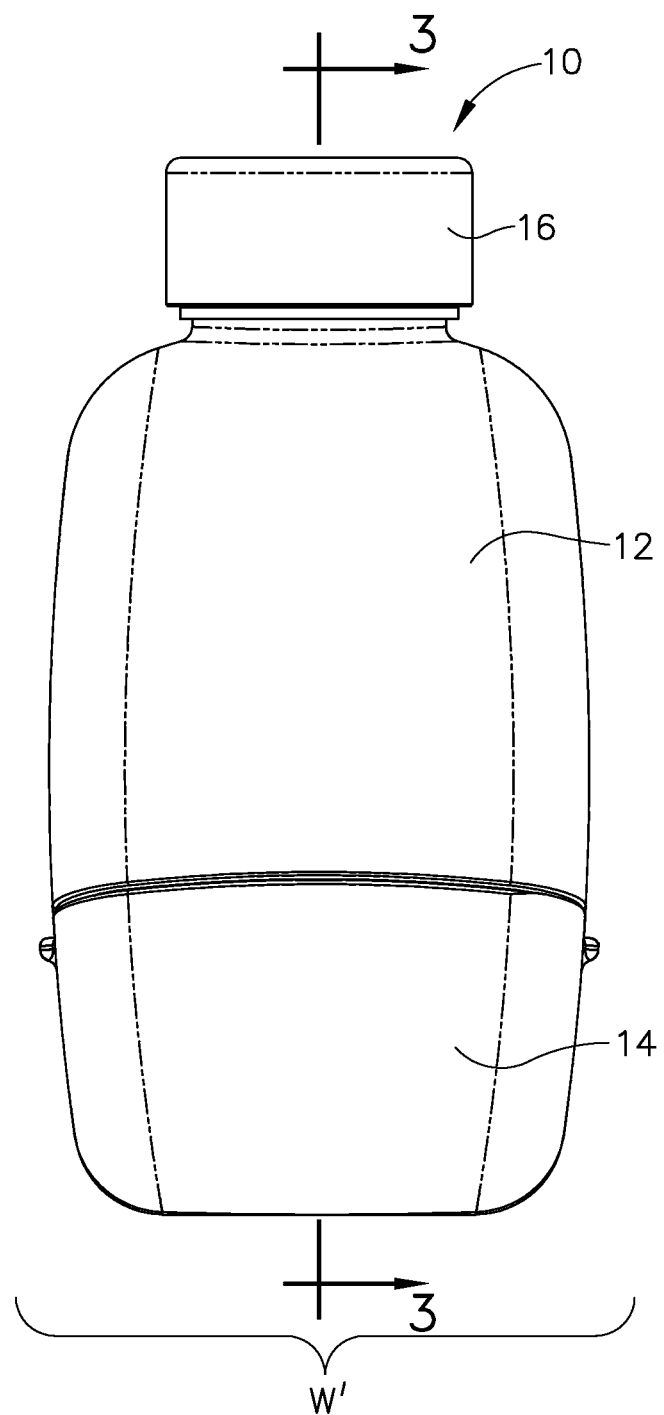
FIG. 2 is a side elevation view of the container assembly of FIG. 1.

In reference to FIGS. 1 and 2, container assembly 10 is shown which includes container 12 and receptacle member 14. Container 12, in this embodiment, takes on the configuration of a bottle which will hold consumable materials such as fluids which would provide hydration and/or nutrition for your pet or food items for feeding your pet. Consumable materials, for example, can include a wide variety of fluids for your pet. Container 12 can be filled, for example, with flavored or scented balanced pet water in accordance with Association of American Feed Control Officials (AASCO) guidelines. In this embodiment, water has been filled into container 12 which includes items such as vitamins and electrolytes beneficial to your pet. Consumable materials can also include a wide variety of food items which are also nutritious for your pet, which may have a dry, fluid or combination of dry and fluid consistency.

The volume of container 12 is sized to hold a reasonable amount of consumable material which is to be consumed by your pet and at the same time accommodate the pet owner in conveniently carrying container 12. Thus, container 12 can be made in a wide variety of sizes. In this example, container 12 carries between twelve (12) to twenty (20) fluid ounces of volume. This compact size makes it easy for the owner to store container 12 in a purse or backpack, for example. Moreover, it provides efficiencies in shipping and in shelf display.

Container 12 can be made of a wide variety of materials such as plastic, glass, metal etc. However, in this embodiment, with container 12 being disposable once the consumable material contents have been depleted, this embodiment would be made of plastic. Similarly, with the disposability of receptacle member 14, this embodiment of receptacle member 14 would also be constructed of a plastic material. In this embodiment, container or bottle 12 could be constructed of blow molded PET (Polyethylene terephthalate) plastic material or extruded HDPE (High density polyethylene). In contrast, receptacle member 14 would be constructed of injected molded PP (Polypropylene) a different plastic material. This construction provides container 12, in this example, to be more flexible in construction than receptacle member 14, wherein container 12, in this example, would have the flexibility of a milk bottle. In contrast, receptacle 14, in this example, has a stiffer less flexible construction much like a plastic bowl. The construction of container assembly 10, in this embodiment, provides the user the ability to pull or push on receptacle member 14 to separate receptacle member 14 from container 12 while holding container 12. The engagement and disengagement of receptacle member 14 from container 12 will be discussed in more detail below. At the same time, this embodiment provides receptacle member 14 with a more robust construction and with sufficient integrity to hold the consumable material from which the pet consumes the contents placed therein from container 12.

Container assembly 10 further includes in this embodiment, cap 16, which will be discussed in more detail below. Cap 16 is used to open and close container 12 so as to access the consumable material contained within container 12. Cap 16 is used to also seal contents of container 12 should not all of the consumable material be consumed. Otherwise, in this embodiment, with container 12 depleted of its contents, assembly 10 is discarded.

Figure 5:
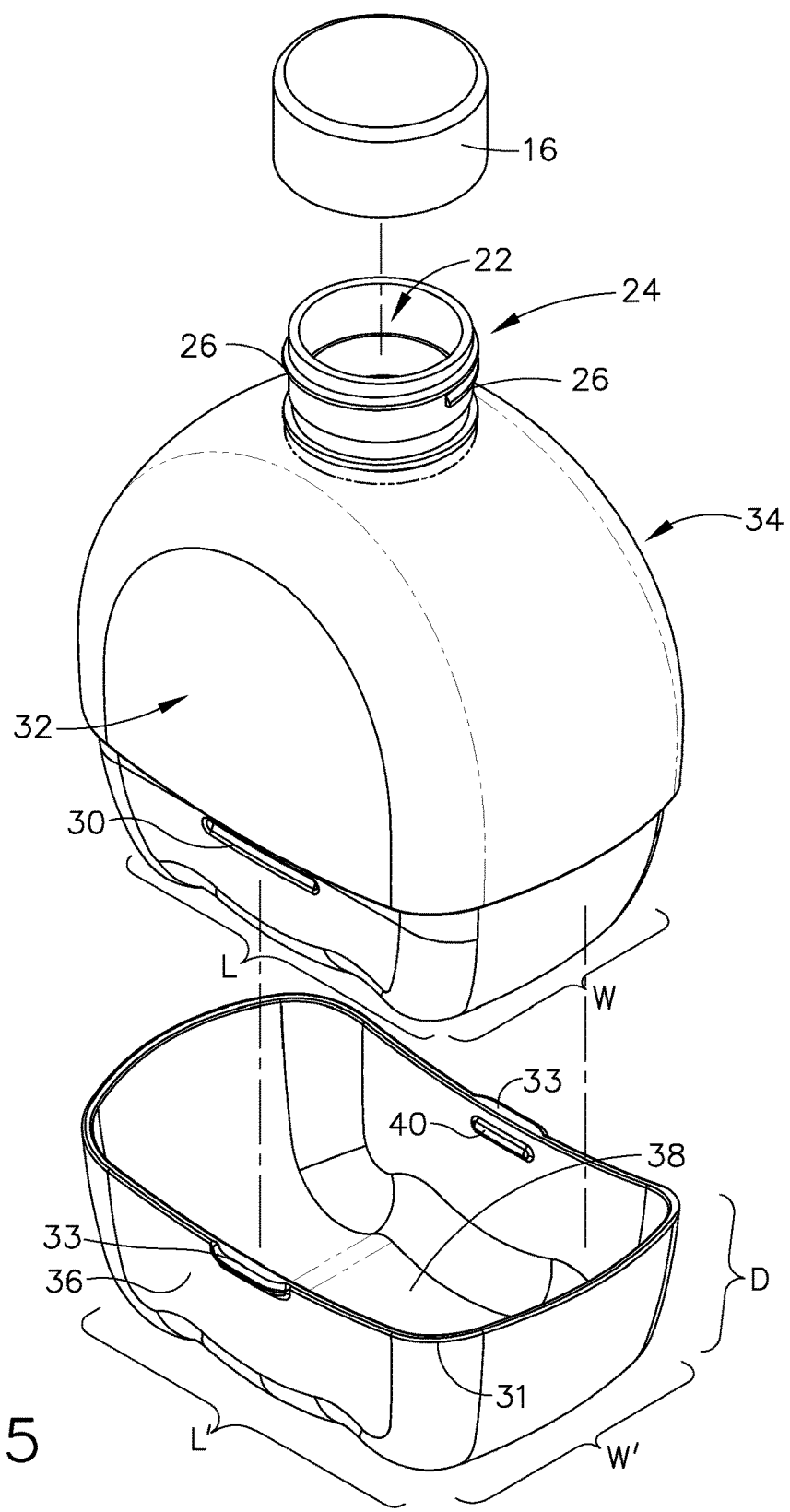
FIG. 5 is an exploded perspective view of the container assembly of FIG. 1.

As understood in this embodiment, receptacle member 14 is slightly larger than a portion of container 12 with which receptacle member 14 releasably engages. A portion of container 12 nests within receptacle member 14, making container assembly 10 a compact configuration. This compact configuration allows the pet owner to more easily stow container assembly 10 within a purse or backpack or the like. In this embodiment, as seen in FIGS. 1 and 2, container 12 and receptacle member 14 has a less rounded construction and is somewhat more flattened. Container 12, as seen in FIGS. 1, 2, and 5 has an oblong configuration, in this embodiment, wherein its length L is greater than its width W. Similarly, receptacle member 14 has its length L' greater than its width W'. This construction serves several purposes, such as, ease in stowing the container assembly 10, as mentioned above, and provides a receptacle member 14 which is elongated and therefore more ergonomically beneficial for particularly larger dogs, that have longer snouts. This elongated construction allows the larger dogs to be able to naturally lap fluid contents positioned within receptacle member 14 with their tongue by inserting their snout unobstructed into receptacle member 14. This similarly, enables the dog to grab food items positioned within receptacle 14 with their mouth without being obstructed by receptacle member 14. The pet, a dog in this example, can naturally stand with the elongated portion of receptacle member 14 extending in the same direction of the dog's elongated snout and comfortably and efficiently consume the contents of receptacle member 14 whether it is a fluid or a food item without receptacle member 14 obstructing the dog's access to the contents within receptacle member 14.

In the present example, length L' of receptacle member 14 is approximately 118 mm long with a depth D that varies approximately between 37 and 45 mm, along with a width W' of approximately 71 mm. This dimensioning provides a large dog with a 90 mm long jaw, for example, a comfortable range for extending its tongue and curling it backwards as it collects fluid and pushes it into it mouth. This dimension would also allow a large dog to comfortably eat. A small dog with a smaller jaw does not need as much length and depth to extend and curl its tongue for drinking, for example, and will naturally approach container 12 from the front side 32 where the receptacle member 14 extends to a depth of approximately 37 mm, in this example.

Figure 3:
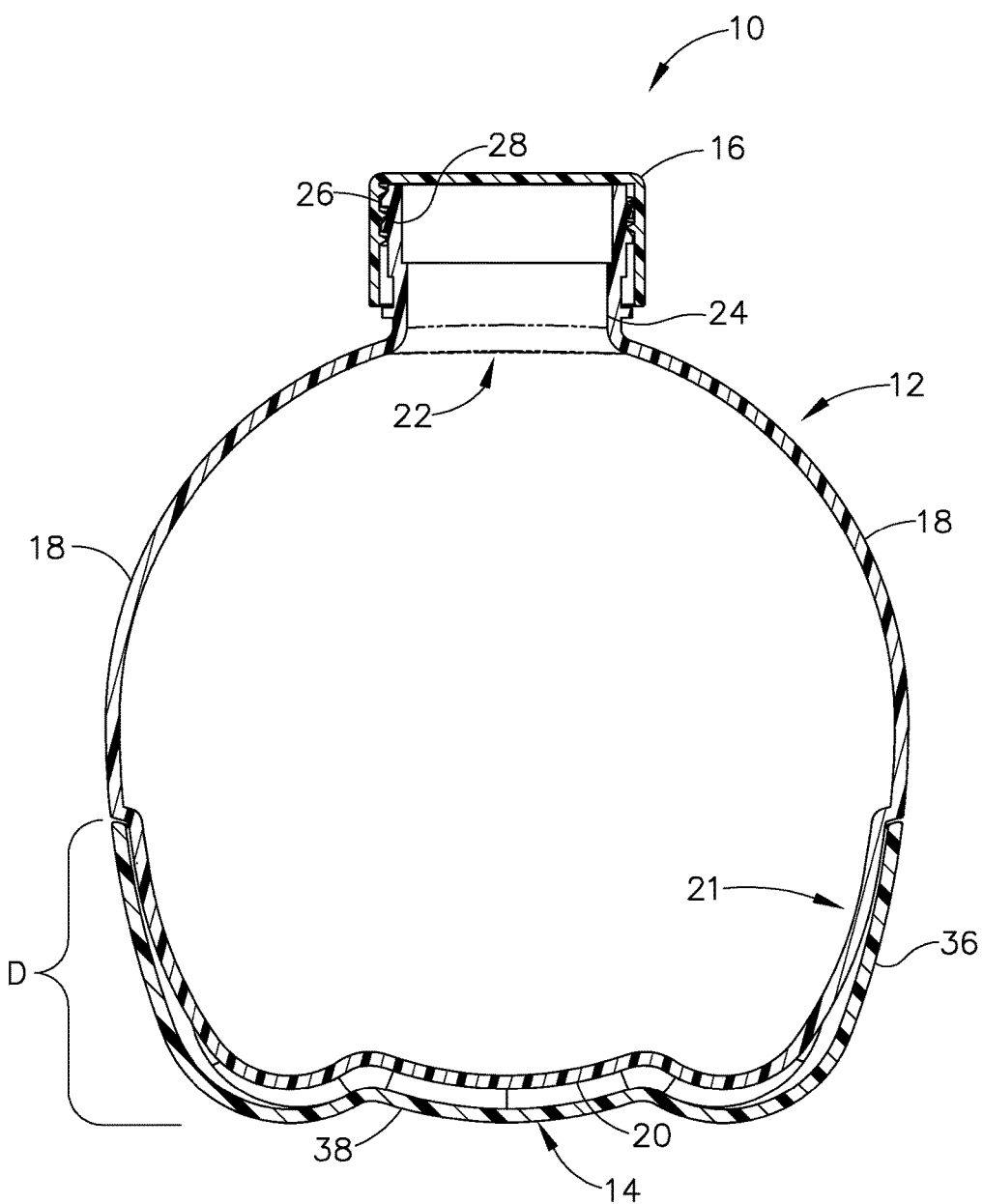
FIG. 3 is a cross section view of the container assembly of FIG. 1 as seen along line 3-3.
Figure 4:
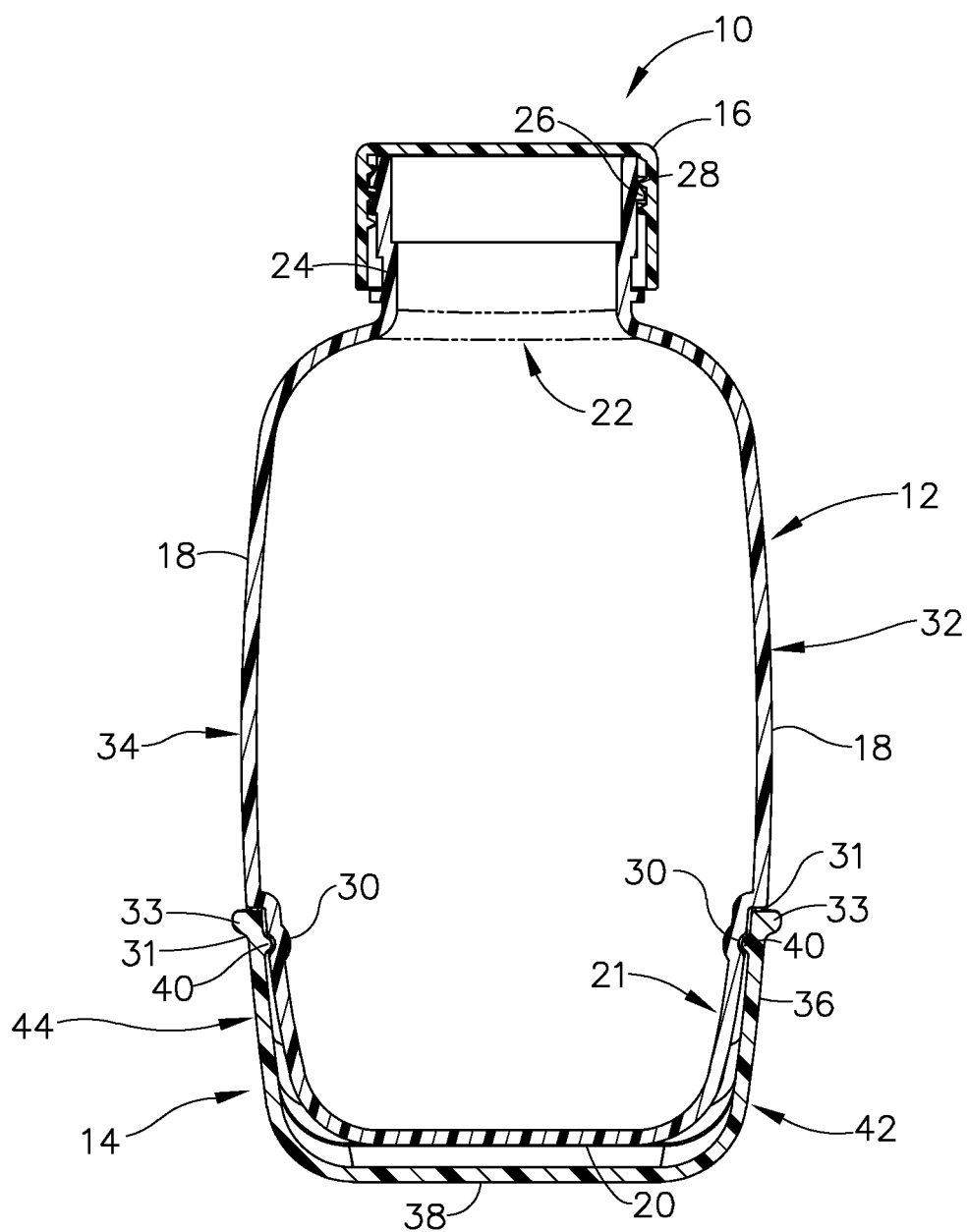
FIG. 4 is a cross section view of the container assembly of FIG. 2 as seen along line 4-4.

In referring to FIGS. 3-5, the nesting of container 12 within receptacle member 14 can be seen. In this embodiment, sidewall 18 and bottom 20, of container 12, are integrally formed together with container 12 having been blow molded or extruded. Sidewall 18 defines an opening 22 which in this embodiment, sidewall 18 defines neck 24 which forms opening 22. Neck 24 defines threads 26 which are configured to be compatible for releasably engaging threads 28 defined by cap 16. Threads 26 and 28 are employed to secure and unsecure cap 16 to container 12.

Sidewall 18 also defines at least one recess 30, as shown in FIGS. 4 and 5, used for releasably engaging container 12 to receptacle member 14. In this embodiment, two recesses 30 are positioned spaced apart from one another wherein one is positioned on one side 32 and the other on an opposing side 34, front and back, of container 12. As can be seen in FIGS. 3-5, receptacle member 14 is configured such that it is slightly larger than container 20 so as to receive a lower portion 21 of container 12 which includes bottom 20 of the container 12 within receptacle member 14. In this embodiment, lower portion 21 of container 12 includes approximately the lower one third of container 12. Receptacle member 14 includes sidewall 36 connected to bottom 38, which in this embodiment, sidewall 36 is integrally connected to bottom 38 wherein receptacle member 14 is a single injected molded piece.

Figure 6:
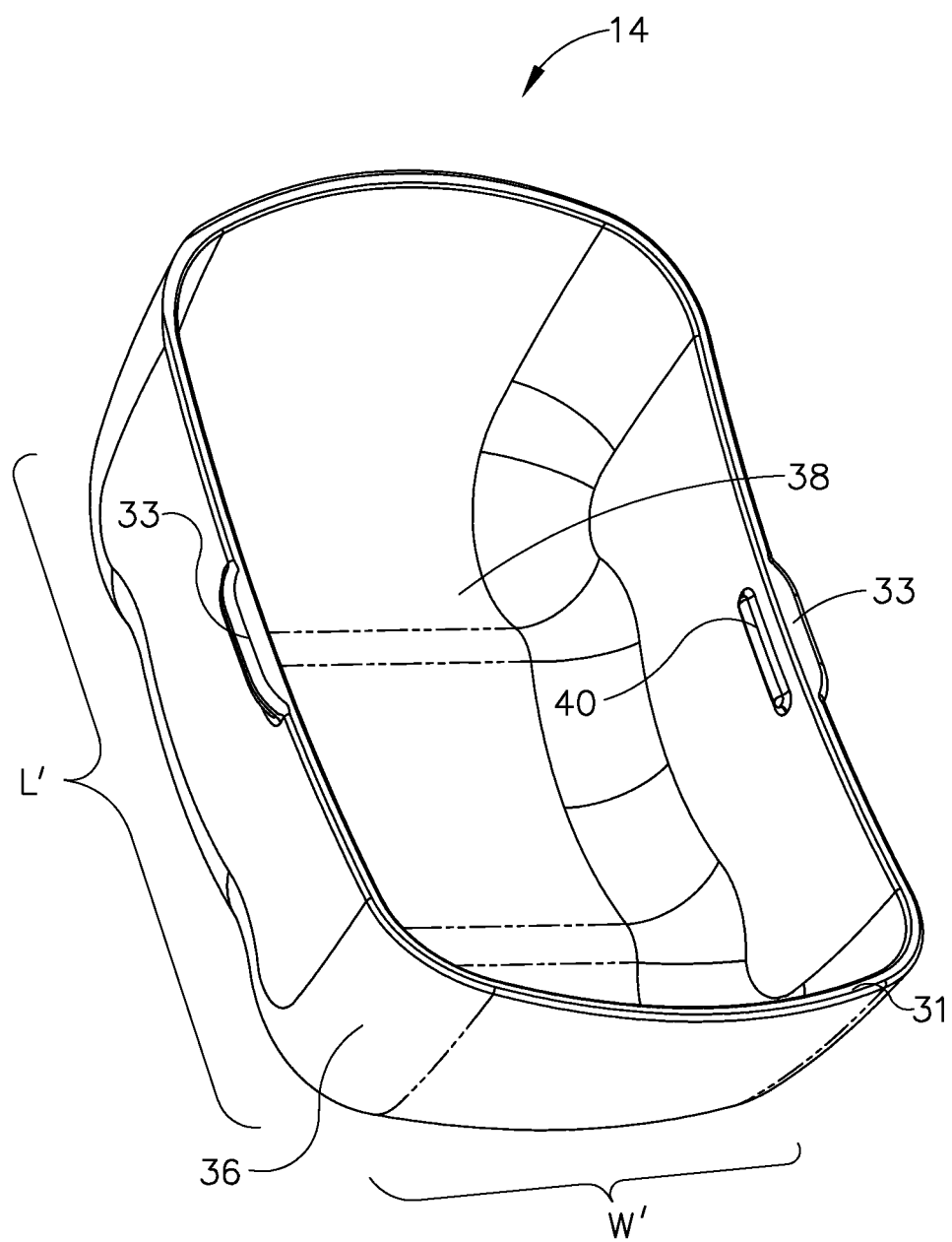
FIG. 6 is top perspective view of the receptacle of the container assembly of FIG. 1.

Sidewall 36 of receptacle member 14 also defines at least one bead 40, as seen in FIGS. 4-6. In this embodiment, two beads 40 are provided spaced apart on opposing sides 42 and 44 of receptacle member 14 being front and back of receptacle container 14. In the present embodiment, the two beads 40 positioned on the front and back of receptacle member 14 and extend outwardly from container 12, with a length, in this embodiment, of approximately one half of an inch. The two recesses 30, for this embodiment, are positioned on opposing sides, front and back, of container 12. With container 12 nested inside of receptacle member 14, beads 40 are aligned with and snap fit into recesses 30. Recesses 30 are sized to receive beads 40 so as to maintain receptacle member 14 secured to container 12 with beads 40 received in recesses 30.

The snap fit engagement between container 12 and receptacle member 14 is provided with sidewall 18 of container 12 and sidewall 36 of receptacle member 14 converging together. For example, sidewall 18 and sidewall 36 provide a snug fit with one another at the locations of recesses 30 and beads 40 near rim 31 of receptacle member 14. In addition, in this embodiment, with the snug fit of sidewalls 18 and 36 at these locations and with receptacle member 14 sidewall 36 constructed with a stiffer construction than sidewall 18 of container 12, beads 40 are secure within recesses 30 engaging receptacle member 14 and container 12 together. Thus, with nesting container 12 into receptacle member 14 and snap fitting beads 40 into recesses 30, receptacle member 14 releasably secures to container 12.

It is contemplated that in other embodiments, beads 40 would be defined by and positioned on sidewall 18 of container 12 extending in an outward direction relative to the interior of container 12. In such an embodiment, recesses 30 would be defined by and positioned in sidewall 36 of receptacle member 14 to face beads 40 and provide a snap fit together of container 12 and receptacle member 14. Thus, employing one or many of each of beads 40 and recesses 30 to engage one another will provide releasable engagement of receptacle member 14 to container 12.

Thus, with container 12 nested within receptacle member 14 and at least one of beads 40 engaged with at least one of recesses 30 and with sidewall 36 of receptacle member 14 providing sufficient depth D to receptacle member 14, as seen at FIGS. 3-5, bottom 20 of container 12 is positioned spaced apart from bottom 38 of receptacle member 14. In this embodiment, the spacing between bottoms 20 and 38 is approximately 3 mm (millimeters). Additionally, with container 12 nested within receptacle member 14 and at least one of beads 40 aligned and engaged with at least one of recesses 30, at least a portion of sidewall 36 of receptacle member 14 is positioned spaced apart from sidewall 18 of container 12. As can be seen in FIGS. 3 and 4 sidewall 18 slopes away from sidewall 36 of receptacle member 14 as sidewall 18 extends toward bottom 20. Sidewalls 18 and 36, in this embodiment, become separated by approximately 5 mm (millimeters). The separation created between bottoms 20 and 38 and sidewalls 18 and 36 reduces the creation of friction between surfaces of bottoms 20 and 38 and sidewalls 18 and 36 of container 12 and receptacle member 14. This configuration reduces the amount of friction between container 12 and receptacle member 14 and permits user ease in removing and separating receptacle member 14 from container 12, as well as, similarly re-engaging receptacle member 14 to container 12. The separation of bottoms 20 and 38 and sidewalls 18 and 36 also prevent suction from being created should some moisture be retained on the interior of receptacle member 14 after an initial use. If no space was provided between these surfaces, resisting friction for engaging and disengaging container 12 together to receptacle member 14 would be created making it more difficult to remove and engage container 12 and receptacle member 14, and providing the potential for creating a suction between them.

The separation between bottoms 20 and 38 and sidewalls 18 and 36 also provide a more pleasant experience for the owner and a more sanitary experience for the pet. With this separation, the saliva deposited within receptacle member 14 during the pet's eating or drinking experience is then not transmitted to the side of container 12. The owner does not have to contact the pet's saliva in grasping container 12. Additionally, positioning receptacle member 14 mostly separated from container 12 with the separation provided, also prevents cross contamination of bacteria and parasites occurring within receptacle member 14 without the interior of receptacle member 14 contacting the side of container 12 which has been handled by the owner's hands and in contact with the environment. Additionally, with this configuration placing receptacle member at the bottom keeps the interior of receptacle member away from cap 16 or neck 24 region of container 12, preventing cross contamination to the contents of container 12.

Container assembly 10 provides a manufacturer the opportunity to make or provide a quality consumable hydrating product under controlled manufacturing conditions which can be bottled with filling container 12. Container assembly 10 containing the hydrating fluid can be provided to the customer/pet owner. Container assembly 10 provides the pet owner the convenience of the nested receptacle member 14 which can be easily separated from container 12 and re-secured to container 10 so as to serve the hydrating product to their pet as needed. This hydrating fluid can, in some embodiments, include at least one of vitamins and electrolytes or even a flavor. Similarly, under manufacturing controlled conditions, quality pet food items can also be prepared and provided to the pet owner within container 12 and fed to their pet with receptacle 14 carried by container 12. Thus, container assembly 10 allows eatable or drinkable contents to be provided to a pet under controlled healthy conditions, conveniently served to the pet and naturally consumed by the pet with the pet in a standing position. In this embodiment, once the fluid or food is consumed, container assembly 10 can be easily disposed of and recycled.

In using container assembly 10, disengaging receptacle member 14 from container 12 can be accomplished by simply grasping container 12 with one hand and receptacle member 14 with another hand and pulling receptacle member 14 away from container 12. In this embodiment, opposing beads 40 of receptacle member 14 push against opposing recesses 30 of container 12 and flexes sidewall 18 allowing beads 40 to exit recesses 30 of container 12 and permitting receptacle 14 to be removed from container 12. This disengagement can be facilitated with the use of tabs 33 being provided on opposing sides of receptacle member 14, such that, user can grasp and push or pull on tabs 33 to remove receptacle member 14 away from container 12. With receptacle 14 separated from container 12, receptacle 14 can be placed on a relatively flat surface. Threads 26 of container 12 can be disengaged from compatible threads 28 of cap 16 thereby removing cap 16 from container 12 permitting contents of consumable material to be dispensed into receptacle member 14. Once your pet has consumed sufficient contents of receptacle member 14, the remaining portion, if any, can be discarded. Should container 12 still contain a portion of consumable material, cap 16 can be re-secured to container 12 and receptacle member 14 can be snap fit releasably engaged to container 12 for a later use. When all of the contents of container 12 have been consumed, the container assembly 10, as mentioned above, can then be discarded.

Thus, container assembly 10 provides an opportunity for the pet owner to purchase a controlled manufactured product wherein container 12 has been filled with a consumable material and be able to conveniently, hygienically and with little or no mess feed the consumable material to their pet at a destination away from the conveniences of home and subsequently dispose of container assembly 10 when the contents of container 12 have been depleted.

What is claimed:

1. A container assembly for carrying a consumable material, comprising:
   a container comprising a sidewall and a bottom connected to the sidewall wherein the sidewall defines an opening and one of a bead or a recess; and
   a receptacle member configured to receive a portion of the container including the bottom of the container, wherein:
   the receptacle member comprises a sidewall and a bottom connected to the sidewall
   the sidewall of the receptacle member defines the other of the one of the bead or the recess; and
   the sidewall of the receptacle member defines a depth of the receptacle member such that with the portion of the container positioned within the receptacle member and the one of the bead or the recess of the sidewall of the container secured to the other of the one of the bead or the recess of the sidewall of the receptacle member, the bottom of the container and the bottom of the receptacle member are maintained in a spaced apart relationship and at least a portion of the sidewall of the receptacle member which extends from the bottom of the receptacle member is positioned in a spaced apart relationship with at least a portion of the sidewall of the container, such that the spaced apart relationship of the bottom of the container with the bottom of the receptacle member extends uninterrupted to and in communication with the spaced apart relationship of the at least a portion of the sidewall of the receptacle member with the at least a portion of the sidewall of the container.

2. The container assembly for carrying a consumable material of claim 1 wherein the container has an oblong configuration wherein a length is greater than a width.

3. The container assembly for carrying a consumable material of claim 1 wherein the receptacle member has an oblong configuration wherein a length is greater than a width.

4. The container assembly for carrying a consumable material of claim 1 wherein the sidewall of the container defines two recesses wherein one recess is positioned on one side of the container and the other recess is positioned on an opposing side of the container.

5. The container assembly for carrying a consumable material of claim 4 wherein the sidewall of the receptacle member defines two beads wherein one bead is positioned on one side of the receptacle member and the other bead is positioned on an opposing side of the receptacle member such that with the container received by the receptacle member the one bead and one recess are aligned with one another and the other bead is aligned with the other recess.

6. The container assembly for carrying a consumable material of claim 1 wherein the container is constructed of one of polyethylene terephthalate and high density polyethylene.

7. The container assembly for carrying a consumable material of claim 6 wherein the receptacle member is constructed of polypropylene and wherein the container is more flexible than the receptacle member.

8. The container assembly for carrying a consumable material of claim 1 wherein the sidewall of the container defines a neck defining the opening and wherein the neck defines threads.

9. The container assembly for carrying a consumable material of claim 8 further including a cap defining threads compatible with the threads defined by the neck.

10. A method for assembling a container assembly for carrying a consumable material, comprising the steps of:
providing a container comprising a sidewall and a bottom connected to the sidewall wherein the sidewall defines an opening and one of a bead or a recess; and
engaging a receptacle member configured to receive a portion of the container including the bottom of the container, wherein:
the receptacle member comprises a sidewall and a bottom connected to the sidewall
the sidewall of the receptacle member defines the other of the one of the bead or the recess; and
the sidewall of the receptacle member defines a depth of the receptacle member such that with the portion of the container positioned within the receptacle member and the one of the bead or the recess of the sidewall of the container is secured to the other of the one of the bead or the recess of the sidewall of the container member, the bottom of the container and the bottom of the receptacle member are maintained in spaced apart relationship and at least a portion of the sidewall of the receptacle member which extends from the bottom of the receptacle is positioned in spaced apart relationship from at least a portion of the sidewall of the container such that the spaced apart relationship of the bottom of the container and the bottom of the receptacle member extends uninterrupted to and in communication with the spaced apart relationship between the at least a portion of the sidewall of the receptacle member and the at least a portion of the sidewall of the container.

11. The method for assembling a container assembly for carrying a consumable material of claim 10 including the step of filling the container with water.

12. The method for assembling a container assembly for carrying a consumable material of claim 11 wherein the water which comprises at least one of a vitamin and an electrolyte.

13. The method for assembling a container assembly for carrying a consumable material of claim 10 wherein the step of providing further includes the container being constructed of a plastic material and the receptacle member constructed of a different plastic material than the plastic material and wherein the sidewall of the receptacle member is less flexible than the sidewall of the container.

14. The method for assembling a container assembly for carrying a consumable material of claim 10 wherein the step of providing further includes the sidewall of the container further defines a neck which defines the opening and wherein the neck defines threads configured to compatibly engage threads defined by a cap.

15. A method for using a container assembly for carrying a consumable material, comprising the steps of:
disengaging a receptacle member releasably secured to a container, wherein:
the receptacle member receives a portion of the container including a bottom of the container
the container comprises a sidewall, wherein the sidewall defines an opening and one of a bead or a recess;
the receptacle member comprises a sidewall and a bottom connected to the sidewall;
the sidewall of the receptacle member defines the other of the one of the bead or the recess and
the sidewall of the receptacle member defines a depth of the receptacle member such that with the bottom of the container positioned within the receptacle member and the one of the bead or the recess defined by the sidewall of the container is secured to the other of the one of the bead or the recess of the sidewall of the receptacle member, the bottom of the container and the bottom of the receptacle member are spaced apart and at least a portion of the sidewall of the receptacle member which extends from the bottom of the receptacle is positioned in spaced apart relationship from at least a portion of the sidewall of the container such that the spaced apart relationship of the bottom of the container and the bottom of the receptacle member extends uninterrupted to and in communication with the spaced apart relationship between the at least a portion of the sidewall of the receptacle member and the at least a portion of the sidewall of the container; and
dispensing the consumable material from the opening of the container into the receptacle member.

16. The method for using a container assembly for carrying a consumable material of claim 15 wherein the step of disengaging includes removing two beads defined by the sidewall of the container from two recesses defined by the sidewall of the receptacle member.

17. The method for using a container assembly for carrying a consumable material of claim 15 further includes the step of placing the receptacle member onto a generally level surface.

18. The method for using a container assembly for carrying a consumable material of claim 15 wherein the sidewall defines a neck which defines the opening, wherein the neck defines threads to compatibly engage threads defined by a cap and wherein a step of unsecuring the cap from the neck precedes the step of dispensing.

19. The method for using a container assembly for carrying a consumable material of claim 15 further includes securing the receptacle member to the container after dispensing a portion of the consumable material contained within the container.

20. The method for using a container assembly for carrying a consumable material of claim 15 wherein the consumable material comprises water which comprises at least one of a vitamin and an electrolyte.

* * * * *

UNITED STATES PATENT AND TRADEMARK OFFICE
CERTIFICATE OF CORRECTION

PATENT NO. : 10,064,388 B2
APPLICATION NO. : 14/568763
DATED : September 4, 2018
INVENTOR(S) : Michael Edward Graves et al.

Page 1 of 1

It is certified that error appears in the above-identified patent and that said Letters Patent is hereby corrected as shown below:

In the Claims

At Column 10, Line 44, "recess and" should be -- recess; and --.

Signed and Sealed this
Twenty-ninth Day of January, 2019

Andrei Iancu
*Director of the United States Patent and Trademark Office*